United States Patent
Ferris et al.

(10) Patent No.: US 8,447,807 B2
(45) Date of Patent: *May 21, 2013

(54) METHOD AND APPARATUS FOR UPDATING AND SYNCHRONIZING INFORMATION BETWEEN A CLIENT AND A SERVER

(75) Inventors: Michael Ferris, Oakland, CA (US); Nicolas Popp, Menlo Park, CA (US); Scott Forstall, Palo Alto, CA (US); Charles D'Harcourt, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/414,482

(22) Filed: Mar. 7, 2012

(65) Prior Publication Data

US 2012/0226745 A1    Sep. 6, 2012

Related U.S. Application Data

(63) Continuation of application No. 13/171,354, filed on Jun. 28, 2011, which is a continuation of application No. 12/407,698, filed on Mar. 19, 2009, now Pat. No. 7,991,834, which is a continuation of application No. 11/230,984, filed on Sep. 19, 2005, now Pat. No. 7,529,841, which is a continuation of application No. 09/863,817, filed on May 22, 2001, now Pat. No. 6,947,967, which is a continuation of application No. 08/825,538, filed on Mar. 31, 1997, now Pat. No. 6,253,228.

(51) Int. Cl.
*G06F 15/16* (2006.01)

(52) U.S. Cl.
USPC .......................... 709/203; 709/248

(58) Field of Classification Search
USPC .......................... 709/203, 224, 248
See application file for complete search history.

(56) References Cited

U.S. PATENT DOCUMENTS

| | | | | |
|---|---|---|---|---|
| 5,796,952 | A * | 8/1998 | Davis et al. | 709/224 |
| 5,860,071 | A * | 1/1999 | Ball et al. | 707/695 |
| 5,926,816 | A * | 7/1999 | Bauer et al. | 1/1 |
| 5,931,904 | A * | 8/1999 | Banga et al. | 709/217 |
| 5,941,957 | A * | 8/1999 | Ingrassia et al. | 709/248 |
| 5,953,005 | A * | 9/1999 | Liu | 715/243 |
| 5,956,709 | A * | 9/1999 | Xue | 705/26.1 |
| 5,991,731 | A * | 11/1999 | Colon et al. | 705/3 |
| 6,108,673 | A * | 8/2000 | Brandt et al. | 715/236 |
| 6,188,400 | B1 * | 2/2001 | House et al. | 715/805 |
| 6,240,450 | B1 * | 5/2001 | Sharples et al. | 709/224 |
| 6,449,653 | B2 * | 9/2002 | Klemets et al. | 709/231 |
| 8,239,481 | B2 * | 8/2012 | Alexander et al. | 709/217 |
| 2007/0208641 | A1 * | 9/2007 | Smith et al. | 705/35 |
| 2009/0158108 | A1 * | 6/2009 | Manning et al. | 714/746 |

* cited by examiner

*Primary Examiner* — Jerry Dennison
(74) *Attorney, Agent, or Firm* — Park, Vaughan, Fleming & Dowler, LLP

(57) ABSTRACT

The present invention provides a method and apparatus for integrating applets running on a client with the application logic for applications running on a server. Instead of using the FORM element available in HTML, individual active applets are available and may be created that obtain user input (e.g. a checkbox, textbox, button, etc.). A hidden applet called the Applet Group Controller is created which handles communication between the applets on the browser and the application logic on the server.

28 Claims, 5 Drawing Sheets

METHOD AND APPARATUS FOR UPDATING AND SYNCHRONIZING INFORMATION BETWEEN A CLIENT AND A SERVER

CROSS REFERENCE TO OTHER APPLICATIONS

This application is a continuation of co-pending U.S. patent application Ser. No. 13/171,354 entitled METHOD AND APPARATUS FOR UPDATING AND SYNCHRONIZING INFORMATION BETWEEN A CLIENT AND A SERVER filed Jun. 28, 2011, which is incorporated herein by reference for all purposes; which is a continuation of U.S. patent application Ser. No. 12/407,698 entitled METHOD AND APPARATUS FOR UPDATING AND SYNCHRONIZING INFORMATION BETWEEN A CLIENT AND A SERVER, now U.S. Pat. No. 7,991,834, filed Mar. 19, 2009, which is incorporated herein by reference for all purposes; which is a continuation of U.S. patent application Ser. No. 11/230,984 entitled METHOD AND APPARATUS FOR UPDATING AND SYNCHRONIZING INFORMATION BETWEEN A CLIENT AND A SERVER, now U.S. Pat. No. 7,529,841, filed Sep. 19, 2005, which is incorporated herein by reference for all purposes; which is a continuation of U.S. patent application Ser. No. 09/863,817 entitled METHOD AND APPARATUS FOR UPDATING AND SYNCHRONIZING INFORMATION BETWEEN A CLIENT AND A SERVER, now U.S. Pat. No. 6,947,967, filed May 22, 2001, which is incorporated herein by reference for all purposes; which is a continuation of U.S. patent application Ser. No. 08/825,538 entitled METHOD AND APPARATUS FOR UPDATING AND SYNCHRONIZING INFORMATION BETWEEN A CLIENT AND A SERVER, now U.S. Pat. No. 6,253,228, filed Mar. 31, 1997, which is incorporated herein by reference for all purposes.

BACKGROUND OF THE INVENTION

1. Field of the Invention

This invention relates to the updating and synchronization of information between a client and a server. More specifically, this invention relates to the updating and synchronization of information between clients and servers on the world wide web through the use of applets.

2. Background

The Internet is a client/server system. A "client" is the computer that you use to access the Internet. When you log onto the World Wide Web portion of the Internet, you view "web pages" that are stored on a remote "server" computer. Sometimes it is possible for a client to make a change or enter data on a web page. A problem with the Internet is that the whole page needs to be resent from the server to the client with the changed or new data. This is slow and cumbersome. Some background on the Internet helps provide an under standing of this problem.

The Internet is a worldwide network of interconnected computers. An Internet client accesses a computer on the network via an Internet provider. An Internet provider is an organic arson that provides a client (e.g., an individual or other organization) with access to the internet (via analog telephone line or Integrated Services Digital Network line, for example). A client can, for example, download a file from or send an electronic mail message to another computer/client using the Internet. An Intranet is an internal corporate or organizational network that uses many of the same communications protocols as the internet. The terms Internet, World Wide Web (WWW), and Web as used herein includes the Intranet as well as the Internet.

The components of the WWW include browser software, network links, and servers. The browser software, or browser, is a user-friendly interface (i.e. front-end) that simplifies access to the Internet. A browser allows a client to communicate a request without having to learn a complicated command syntax, for example. A browser typically provides a graphical user interface (GUI) for displaying information and receiving input. Examples of browsers currently available include Netscape Navigator and Internet Explorer.

A browser displays information to a client or user as pages or documents. A language called Hypertext Markup Language (HTML) is used to define the format for a page to be displayed in the browser. A Web page is transmitted to a client as an HTML document. The browser executing at the client parses the document and produces and displays a Web Page based on the information in the HTML document. Consequently, the HTML document defines the Web Page that is rendered at runtime on the browser.

HTML is a structural language that is comprised of HTML elements that are rested within each ether. An HTML document is a text file in which certain strings or characters, called tags, mark regions of the document and assign special meaning to them. These regions are called HTML elements. Each element has a name, or tag. An element can have attributes that specify properties of the element. Blocks or components include unordered list, text boxes, check boxes, and radio buttons, for example. Each block has properties such as name, type, and value. The following provides an example of the structure of an HTML document:

```
<HTML>
    <HEAD>
    .... element(s) valid in the document head
    </HEAD>
    <BODY>
    .... element(s) valid in the document body
    </BODY>
</HTML>
```

Each HTML element is delimited by the pair of characters "<" and ">". The name of the HTML element is contained within the delimiting characters. The combination of the name and delimiting characters is referred to as a marker, or tag. Each element is identified by its marker. In most cases, each element has a start and ending marker. The ending marker is identified by the inclusion of another character, "/" that follows the "<" character.

HTML is a hierarchical language. With the exception of the HTML element, all other elements are contained within another element. The HTML element encompasses the entire document. It identifies the enclosed text as an HTML document. The HEAD element is contained within the HTML element and includes information about the HTML document. The BODY element is contained within the HTML. The BODY element contains all of the text and other information to be displayed.

Information servers maintain the information on the WWW and are capable of processing a client request. HyperText Transfer Protocol (HTTP) is this standard protocol for communication with an in formation server on the WWW. HTTP has communication methods that allow clients to request data from a server and send information to the server.

To submit a request, the client contacts the HTTP server and transmits the request to the HTTP server. The request contains the communication method requested for the transaction (e.g., GET an object from the server or POST data to an object on the server). The HTTP server responds to the client by sending a status of the request and the requested information. The connection is then terminated between the client and the HTTP server.

A client request therefore, consists of establishing a connection between the client and the HTTP server, performing the request, and terminating the connection. The HTTP server does not retain any information about the request after the connection has been terminated. HTTP is, therefore, a stateless protocol. That is, a client can make several requests of an HTTP server, but each individual request is treated independent of any ether request. The server has no recollection of any previous request. The server does not retain state from a prior request.

An addressing scheme is employed to identify Internet resources (e.g., HTTP server, file or program). This addressing scheme is called Uniform Resource Locator (URL). A URL contains the protocol to use when accessing the server (e.g., HTTP), the internet domain name of the site on which the server is running, the port number of the server, and the location of the resource in she file structure of the server.

The WWW uses a concept known as hypertext. Hypertext provides the acuity to create links within a document to move directly to other information. To activate the link, it is only necessary to click on the hypertext link (e.g., a word or phrase). The hypertext link can be to information stored on a different site than the one that supplied the current information. A URL is associated with the link to identify the location of the additional information. When the link is activated, the client's browser uses the link to access the data at the site specified in the URL.

If the client request is for a file, the HTTP server locates the file and sends it to the client. An HTTP server also has the ability to delegate work to Common Gateway interface (CGI) programs. The CGI specification defines the mechanisms by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data, generates an HTML document, and returns the HTML document as its response to the server using CGI (via standard input, for example). The server forwards the HTML document to the client using the HTTP. In this respect, although the gateway programs have the ability to generate HTML, the document displayed by the browser remains a static document. Thus, each time information is requested from the server, a completely new HTML document containing the information is created, transmitted to the client, and loaded/rendered on the client's browser.

The WWW is often used to exchange information between the client (browser) and the server. In many circumstances, the server maintains a database and the client may desire to search, update or edit the database. In this respect, information is managed on the browser that the client is editing. Due to the fact that the client and server are often maintained on separate and distinct computer systems, changes made on the browser need to be reflected on the server and if information on the server changes, the browser needs to reflect those changes; in other words, the information between the client and server needs to be synchronized.

HTML includes a FORM element that provides the ability to create a fill-in form for the client. An HTML document containing a FORM element permits the user to enter information. The user enters the information through the use of a limited number of FORM components: checkboxes; radio boxes; pull-down lists; text windows; and menus. Additional components cannot be created using an HTML FORM element. The information entered through the FORM components is transmitted as a single unit to a gateway program on the HTTP server. In this manner, FORMs can be used to input Information. However, FORM elements may not be placed inside a HEADING element, inside another FORM, or inside character emphasis markups (i.e. STRONG or EM). As a result, all information input into a FORM must be transmitted in one unit. Thus, several FORMs must be created in order to transfer information to several different gateway programs. In this manner, if the gateway program merely requires one parameter, an entire FORM must be created to accept the parameter from the user. In addition, the FORM element does not provide functionality for synchronizing data between a client and a server.

The information collected on a form is sent to a gateway program in NAME/VALUE pairs, where NAME is the value assigned to the name attribute of the element, and VALUE is the value assigned by the user's input. For example, if the user named a pull-down list "CITY" and selected the city of "HOUSTON" from the pull-down list, the NAME/VALUE pair sent to the gateway program is "CITY/HOUSTON". In this manner, all of the information collected from the user is transmitted to the gateway program. However, the FORM element does not provide the ability to transmit the name-value pairs from the server back to the client. Additionally, the FORM element does not identify the action to be taken by the server or the gateway program.

As described above, the gateway program (which has to be specifically designed to accept the name/value pairs from the client) performs the desired actions or methods and generates an HTML document that is transmitted back to the client (with the results of the desired action, if any). Since the server is stateless, to preserve any of the name/value pairs originally transmitted to the server, the server or CGI program must retransmit the name/value pairs back to the client in an <INPUT TYPE="hidden"> element, within the returned HTML document (which may contain a new FORM), as a record of the state of the client-server transaction. Therefore, each time information needs to be updated on the client's browser due to changes made during execution of the gateway program, an HTML definition that defines the Web page (including any name/value pairs within a new FORM) must be transmitted to the client for rendering on the clients display. The transmission and rendering of an entire page is time consuming and undesirable, especially when only a small portion of the page has changed. As a result, information transmitted through using the current capabilities is not efficient and cannot be displayed quickly on the client and/or server.

SUMMARY OF THE INVENTION

The present invention provides a method and apparatus for integrating applets running on a client with applications running on a server (the client and server can be on the same or different computer systems). The mechanism of the present invention provides significant advantages over the prior art including the synchronization of information between a client and server, the recognition of user events in the browser, and the invocation of appropriate action logic in a server.

The prior art provides for the use of HTML (a programming language used to define a Web page on the Internet). The Web page definition (written in HTML) consists of numerous elements that are combined to produce the entire page. One such element provides for a fill-in form (a HTML FORM element) that allows a user (client) to input information onto a form displayed by the client. The FORM element has many limitations that the present invention addresses using individual applications or applets that run on a client. The applets are defined outside or a Web page and can be programmed to produce an unlimited number of input mechanisms to a user (e.g., checkboxes, textboxes, buttons, etc.).

In the present invention, a hidden applet called the Applet Group Controller is created which handles the communication between the applets and the server. In one embodiment, upon the invocation of an event in the browser (e.g., the pressing of a button created by an applet), an "Association" (located in the Applet Group Controller) instructs an Action Coordinator (located in the Applet Group Controller) to invoke an action (e.g., search a database on the server containing user specified values). In response, the Action Coordinator obtains and transmits a list of all of the values received from the user, and the action to be invoked to the server.

The server invokes the appropriate functions utilizing the values transmitted from the Action Coordinator and retransmits the values (including any values that may have changed as a result of the invoked action) back to the Action Coordinator. The Action Coordinator then pushes the updated values out to the applets (through their Associations). The applets update their displays in the browser's display using the new values. In this manner, the information between the client and the server is synchronized quickly without the need to display a new HTML document.

DETAILED DESCRIPTION OF THE INVENTION

A method and apparatus for synchronizing information between a client and a server is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
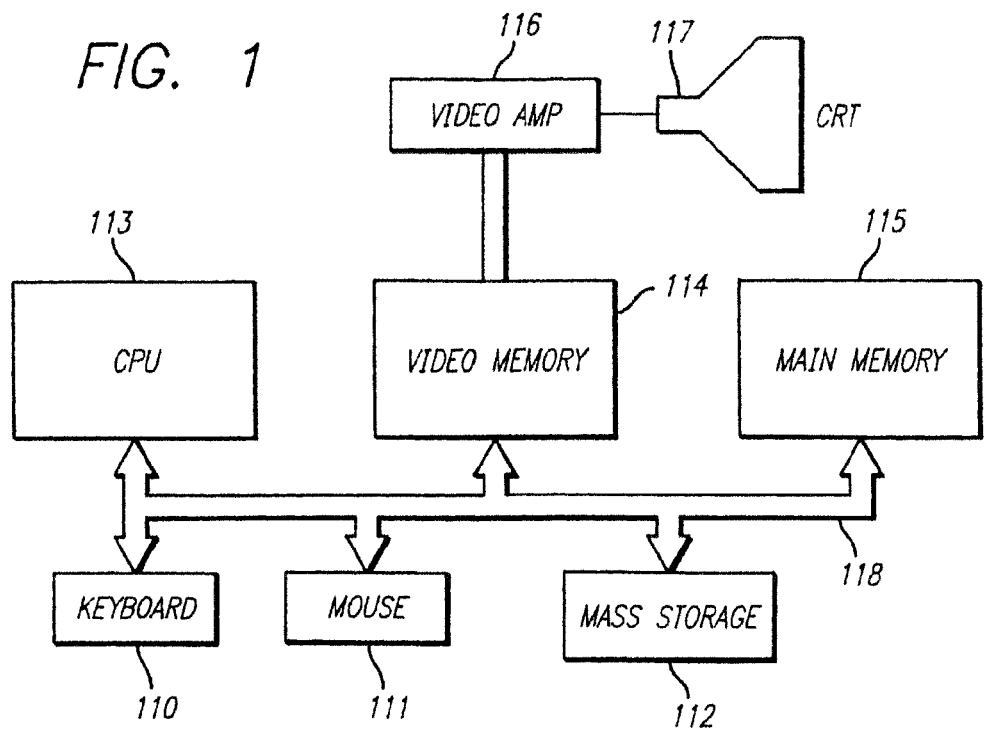
FIG. 1 provides an example of a general purpose computer to be used with an embodiment of the invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain; for example, 32 address lines for addressing video memory 114 or main memory 115. The system bus 118 also includes, for trample, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit micro processor manufactured by Motorola, such as the 680X0 processor, 60X RISC processor, or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray rube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. When a general purpose computer system such as the one described executes the processes and process flows described herein, it is a means for synchronizing information between a client and a server.

In the computer industry, a program that commences operation from WWW document (an HTML document) is referred to as an "applet". An applet can be used to transmit data to a server and receive data from the server without having to transmit the entire Web page.

The present invention provides a method for synchronizing information between a client browser and a server (the client and server can be the same or different computer systems). To avoid the limitations present with the FORM element, the preferred embodiment of the present invention uses individual applets that retrieve user input and an applet controller that manages communication between the applets and the browser and server. The applets can be written using a programming language such as Java. The advantages of a programming language such as Java include: the ability to write an unlimited number and variety of programs. Java applications will run on almost any supporting platform without the need to recompile the code, Java is widely used in WWW applications, and a Java program may be embedded into a Web page (HTML document). Further, a Java program may execute its action logic on either a client or a server (although applets often execute logic on a client's computer).

To commence an applet from an HTML document, the applet is treated as though it were an HTML element with an applet tag. The applet tag specifies the location of the class file (a class file contains a description of a specific kind of programmed object, including the instructions that are particular to that object) and the display area allocated to the applet. For example, to launch an applet that displays a calendar, the lines of HTML code might read:

```
<APPLET CODE=next.wof.widgets.CalendarApplet.class
    WIDTH=203 HEIGHT=200>
</APPLET>
```

When the browser executes the above lines of code, it will ask the computer system to lead "next.wof.widgets.CaiendarApplet.class". The browser also informs the computer system that the applet may draw or occupy a region that is 203 by 200 pixels (the top left corner of the applet's display area is determined by the browser based on the Web page's HTML definition). As in other programming languages, the applets may utilize various parameters that may be initialized and passed to the applet through the HTML document (as Param tags).

The HTML elements that define a Web page can be included in a single file. In a preferred embodiment of the present invention, a file that contains HTML elements is referred to as an HTML template. An HTML template may define all or a subset of the Web page. Two or more HTML templates mat define portions of the Web page can be combined to provide a complete definition. An HTML template is used to generate an HTML document (or definition) for a Web page, in the preferred embodiment, an HTML template contains HTML element definitions.

In a preferred embodiment of the present invention, special HTML tags or HTML elements (including apples) are mapped to objects in an object-oriented environment. Classes of objects are defined (in a declarations file) for each HTML element as well) as the HTML template (or page). By providing a one-to-one mapping between each HTML element and object classes, HTML documents can be manipulated programmatically. The properties of each element are stored in instance variables of the associated object. Each object class can include methods to manipulate the HTML element within an HTML document Classes of objects are also defined that do not necessarily map to a particular HTML element. These object classes can generate HTML Statements or manage the acquisition of data used to generate HTML, or that provide conditional functionality that vanes the characteristics of an HTML definition, for example. At runtime, instances of the object classes are instantiated for the HTML elements defined in the HTML document. The following provides an example of an HTML template:

TABLE ONE

```
<html>
<head>
    <title>Capitalize String</title>
</head>
<body bgcolor="#FFFFFF">
    <h2>Mission Critical Client-Server String Capitalization</h2>
    <hr>
    <br>
    Enter a string in the field and press the Do It button:
    <br>
    <WEBOBJECT name=INPUTFIELD></WEBOBJECT>
    <br>
    <WEBOBJECT name=BUTTON></WEBOBJECT>
    <br>
    Result:
    <br>
    <WEBOBJECT name=OUTPUTFIELD></WEBOBJECT>
    <br>
```

TABLE ONE-continued

```
</body>
</html>
```

The above HTML template includes rags fat HTML HEAD, BODY, and WEBOBJECT elements. At runtime, the tags are used to create an object class instance for instances). The HTML template can contain tags (e.g. TITLE. H2, HR, and BR) that define static HTML for which there is no need to instantiate an object class instance. A class is defined for each HTML, element. Attribute information associated with an HTML tag can be used to initialize instance variables of an object. Methods defined for in object can generate HTML statements in an HTML document that define the HTML element associated with the object's class, for example.

The WEBOBJECT tags in Table One (INPUTFIELD, BUTTON, and OUTPUTFIELD) refer (or provide a pointer) to entries in a declarations file that map the entries to object classes and provide declarations for the tag. These declarations can be used to initialize instance variables of an object and provide runtime environment information such as object, method and variable bindings. Table Two provides an example of the contents of a declarations file that accompanies the HTML template of Table One.

TABLE TWO

```
INPUTFIELD :     WOApplet {
    code = "next.webobjects.widgets.TextFieldApplet.class";
    codebase = "/Java_packages";
    width = "200";
    height = "20";
    associationClass = "next.webobjects.widgets.SimpleAssociation";
    stringValue = inputString
};
BUTTON     :     WOApplet {
    code = "next.webobjects.widgets.ButtonApplet.class";
    codebase = "/Java_packages";
    width = "200";
    height = "20";
    associationClass = "next.webobjects.widgets.SimpleAssociation";
    title = "DoIt";
    action = "capitalizeString"
};
OUTPUTFIELD     :     WOApplet {
    code = "next.webobjects.widgets.TextFieldApplet.class";
    codebase = "/Java_packages";
    width = "200";
    height = "20";
    associationClass = "next.webobjects.widgets.SimpleAssociation";
    stringValue = outputString;
};
```

The name attribute of the WEBOBJECT tag binds a WEBOBJECT HTML template entry to the declarations file. For example, the name having a value of "INPUTFIELD" (from the WEBOBJECT tag of Table 1) binds its entry to the INPUTFIELD entry in the declarations file. A similar approach can be taken for the BUTTON and OUTPUTFIELD values associated with the remaining WEBOBJECT tags. The INPUTFIELD, BUTTON, and OUTPUTFIELD declarations bind the WEBOBJECT tag to instances of the WOApplet class. The WOApplet class permits the specification of applet-specific parameters, such as the dimensions of the applet and the location of the ".class" file to download to the browser. It also allows yon to initialize parameters to be downloaded to the applet and to bind an applet's keys to variables and methods in the server. For example, the INPUTFIELD declares a dynamic element called INPUTFIELD that generates the HTML needed to download the Java applet defined in the "next.webobjects.widgets.TextFieldApplet.claas" to the web browser. Further, the dynamic elements called BUTTON and OUTPUTFIELD are defined to generate the HTML needed to download the Java applet defined in "next.webobjects.widgets.ButtonAppet.dass" and "next.webobjects.widgets.TextFieldApplet.class" to the web browser. Thus, the "code=" line in the declarations file maintains the location of the Java applet for each object. Further, the "width=" and "height=" lines provide the display area to be allocated for the applet. In this manner, the declaration file provides the ability to generate the HTML code for the applet (e.g. <APPLET CODE=next.webobjects.widgets.TextFieldApplet.class WIDTH=200 HEIGHT=20></APPLET>).

The declarations file also provides for various keys and values to which the keys are bound. For example, the INPUTFIELD instance of WOApplet has an associationClass key and a stringValue key. The associationClass key is bound to the SimpleAssociation class (Associations are discussed in detail below). The stringValue key is bound to the value of inputString. Similarly, the BUTTON instance of WOApplet has an associationClass key (bound to the SimpleAssociation class), a title key (bound to the character string "DoIt"), and an action key (bound to the character string "capitalizeString"). The values to which the keys are bound are set in a script file (discussed below). The bindings in combination with the Association class (discussed below) provide for the association of state in the applet (on the client) with state in the server and events in the applet with the invocation of methods in the server. Consequently, information between the client and the server may be synchronized.

A script is a type of program that consists of a set of instructors that is read and interpreted by another application (e.g., an interpreter). An instruction is an expression that conforms to the rules and syntax expected by a script interpreter. A script language (set of script instructions) may include simple control statements such as loops and if/then expressions.

Since the language does not include complex constructs, the language is easy to master. As with other interpretive languages, a developer does not have to perform steps to translate a script into machine-readable code. Even though a script is interpreted at runtime, it is not considered to cause any degradation in the overall response time (the actual network response times are the primary concern). Therefore scripts are typically used to provide the logic associated with a Web page. However, the invention can be practiced using other languages such as Objective C, C++, etc. Table Three provides an example of the contents of a script file that accompanies the HTML template of Table One and the Declarations file of Table Two.

TABLE THREE

```
id inputString;
id ouputString;
- awake {
    // Set up parameter values
    inputString = @"Scrumptious";
    outputString = @"";
}
- capitalizeString {
    outputString = [inputString uppercaseString];
    return nil;
}
```

The above script file declares the variables inputString and outputString ("id inputString;" and "id outputString;") and then sets their initial values ("Scrumptious" and " "). The script file then declares the capitalizeString script which self the value of the outputString variable to the capitalization of the value in the inputString variable and returns nil. The stringValue associated with the INPUTFIELD instance (in the declarations file of Table Two) is bound to the value of inputString that is set in the script file. The stringValue from the OUTPUTFIELD instance (in the declarations file of Table Two) is bound to the value of outputString that is set in the script file. The action associated with the BUTTON instance (in the declarations file of Table Two) will invoke the capitalizeString script located in the script file.

In this manner, the HTML template, the declarations file, and the script file are all combined to define a Web page. The above created Web page provides a string capitalizes. Such an interface involves two text fields and a button. The first field is for input and the second field is for displaying the result. The user enter a value in the Input field and presses the button. The output field is set to an all uppercase version of the value entered in the input field. This example further illustrates the object oriented approach and die objectifying (Objective C, C++ objects, SmallTalk objects, etc) of HTML elements.

Upon execution of an applet, the applet initializes itself through an Init procedure that the browser invokes on the client. Subsequent to initialization, the client's browser calls the applet's Start routine and its Paint routine to draw the applet in the browsers display. Thereafter, the browser may recall the Paint routine to redraw/rerender the applet on the client's display. Upon completion of the applet, the applet's Step routine is invoked by the browser.

Applets can display selectable items (e.g. buttons, textboxes, etc), to elicit responses from a user, and to trigger actions. However, there is no facility for using applets to pass data between a server and an applet.

The present invention provides for a mechanism that integrates applets (e.g. Java applets) running on a browser with application running on a server. This mechanism provides at least two significant advantages over the prior art. Firstly, the mechanism provides for the synchronization of state. Synchronization of state permits data that is present on the browser to be updated on the server (if necessary) and data that is present on the server to be updated on the browser (if necessary). Secondly, upon specified events on a browser by the user (e.g., the clicking of a button or selection at a radio button), certain actions may need to occur on the server. The present invention provides for the recognition of these events by the applets in the browser and the invocation of the actions in the server.

In one embodiment, synchronization of state occurs three times. Initially, when a page is generated, all the state for which there are state bindings are sent to the client (initial set-up) (the initialization process is described in detail below). This initial synchronization ensures that the server's data is used to initialize the Web page. The other two points of synchronization surround the invocation of an action. Before an action is invoked in the server, any state that has changed in the client is transmitted back to the server (e.g., state may change when a browser user enters information in an input field of the Web page). Subsequently, after the action has completed, any state that has changed in the server is sent back to the client, in this manner, the method invoiced by the action will only act on the current data (since it has just been transmitted back from the client, and afterwards, anything the action has caused to be changed, is reflected back to the client for the user's viewing), in addition to the above, may occur at any point in time. For example, a timer may be utilized such that synchronization is to occur every five (5) seconds.

The present invention consists of numerous applets that are capable of data display and/or input. In the preferred embodiment of the present invention, various applets are provided to the user including; a TextFieldApplet (a text field permitting text input from a user); a ButtonApplet (a push button); a CheckboxApplet (a toggle button); a ChoiceApplet (a box containing non-editable items that allows multiple selection); a ListApplet (a list of items that can allow multiple Selection); a RadioGroupApplet (a set of mutually exclusive buttons); a ScrollingTextApplet larger text entry area); CalendarApplet (a primitive graphical calendar for entering or displaying dates); and a StatusTextApplet (displays a read-only message center aligned within the applet's frame). Each applet may contain multiple values (e.g. the text in a TextFieldApplet or the selected item in the ListApplet). In addition to the applets provided, a user may program any type of applet as long as it is possible to obtain and set the value of each key that the applet and its Association will support (keys, values, and Associations are explained in detail below), and it must be possible to tell when each supported action occurs (if any) (actions are discussed in detail below). These applets act as a substitute for the FORM element of HTML documents and provide the user the ability to input/retrieve information from the user.

Figure 2:
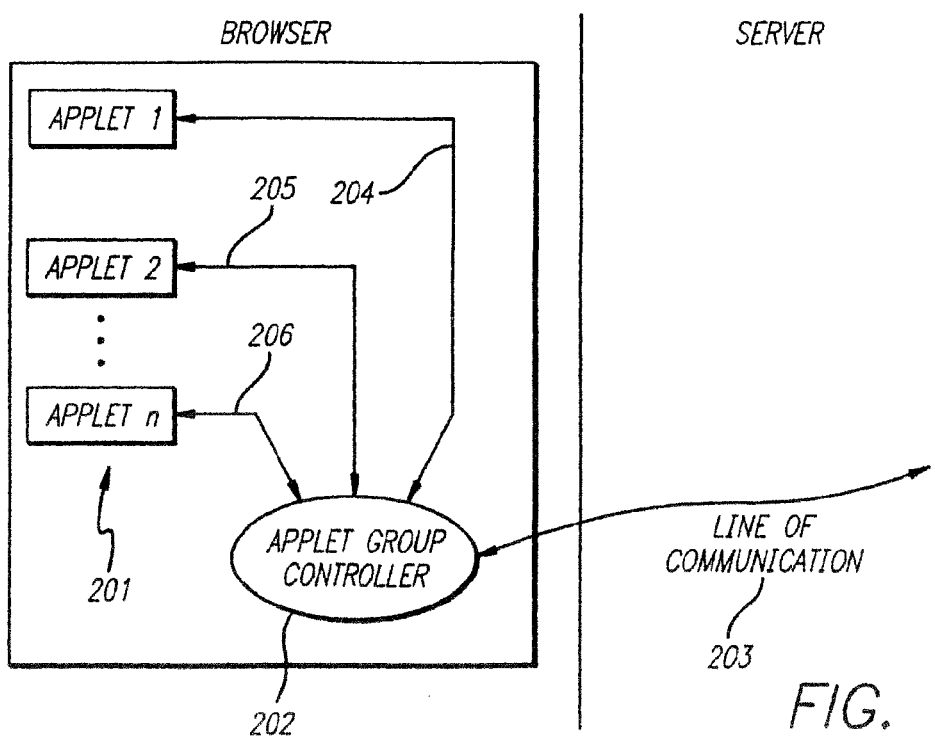
FIG. 2 demonstrates the relationship between applets, the Applet Group Controller, and the server according to an embodiment of the invention.

In addition to the above active applets, there is an additional applet, transparent to the user, that controls the other applets. This transparent applet is called the AppletGroupController ("Controller"). The Controller is responsible for managing the communication and the data synchronization between the client and the server. In the preferred embodiment, the Controller resides on the client's computer system. Therefore, the Controller has a line of communication back to the server. FIG. 2 demonstrates the relationship between applets, the Controller, and the server. An unlimited number of active applets 1 through n 201 provide for the browser's display attributes. Each applet 201 communicates with the Controller 202 which maintains a line of communication 203 with the server.

Figure 3:
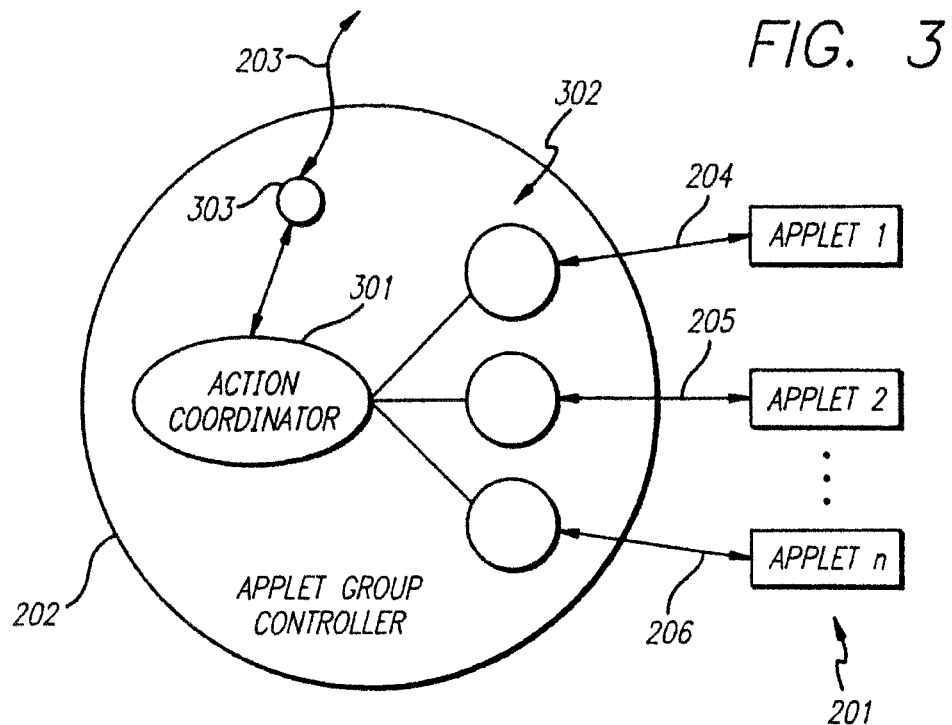
FIG. 3 demonstrates an enlarged view of the Applet Group Controller of FIG. 2.

FIG. 3 demonstrates an enlarged view of the AppletGroupController 202. The Controller 202 includes an Association 302 to each of the applets 201. Controller 202 passes data (or state) through Associations 302 to applets 201. The Associations 302 provide a fixed interface for communications with Controller 202. As a result, Controller 202 utilizes the Associations 302 in a uniform manner. Each of Associations 302 includes an interface (204, 205, and 206) for communicating with applets 201. Different classes of Associations 302 can be used for different types of applets. Each of Association 302 has the ability to obtain and set state for its corresponding applets 201 at runtime. In addition, the Associations 302 are also responsible for knowing when to invoke the applet's supported actions. For example, the API for communication between Associations 302 and applets 201 include the ability to obtain the applet's keys, obtain the key's values, and invoke an applet's action (keys, values, and actions are discussed in detail below). Action Coordinator 301 communicates with Associations 302. Action Coordinator 301 is responsible for state synchronization and for building a package of data to be transmitted back to the server. Communication with the server occurs through Communications Channel 303.

Figure 4:
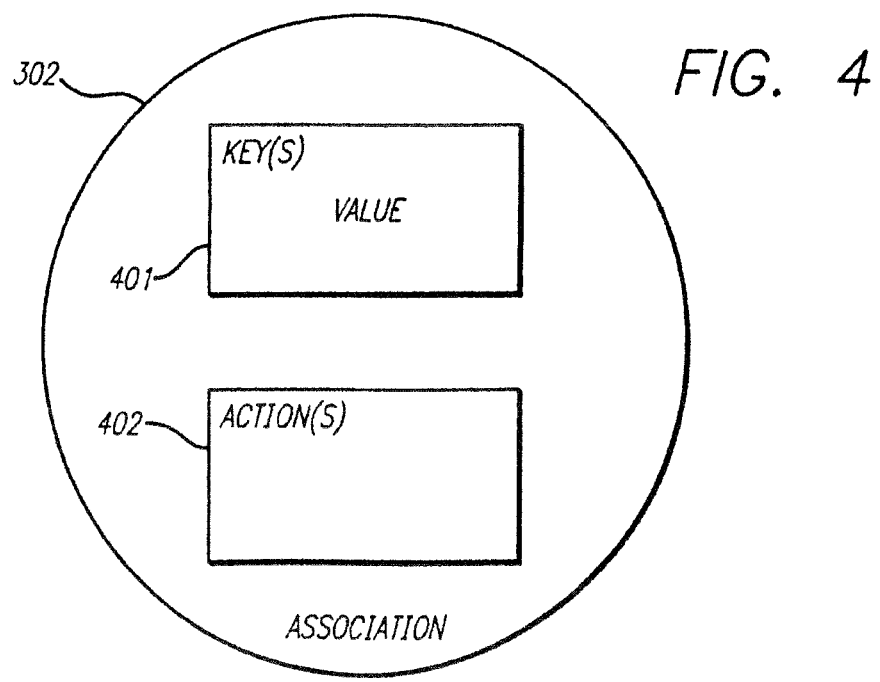
FIG. 4 demonstrates components of an Association according to an embodiment of the invention.

Referring to FIG. 4, Associations 302 include two types of bindings: state bindings 401 and anion bindings 402. State bindings 401 are used to associate state in the applets with state in the server and they form the basis for the state synchronization feature of the present invention. Action bindings 102 are used to associate particular events (e.g., a button being pressed in the client) with the invocation of methods in the server. Applets 201 trigger actions in the server using Anion bindings 402.

Figure 7:
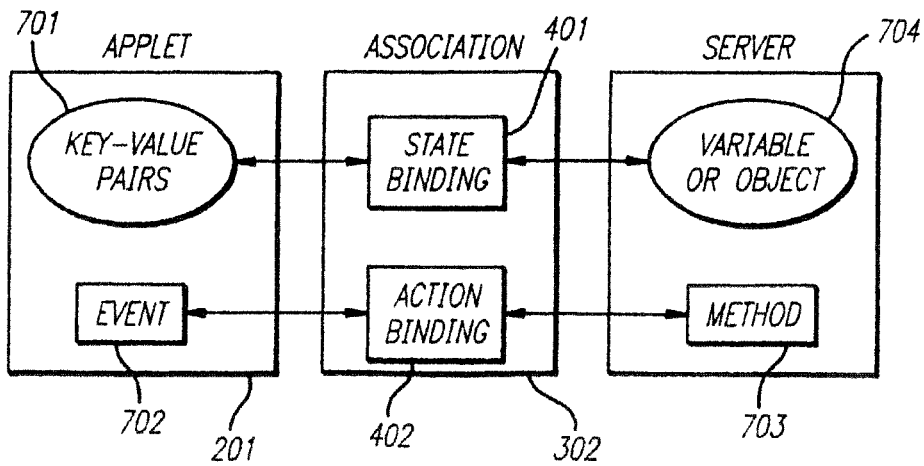
FIG. 7 demonstrates the relationship between Applets, their Associations, and the Server according to an embodiment of the invention.

Referring to FIG. 7, each instance of applets 201 manages a set of key-value pairs 701. State bindings 401 include a list of "keys" that represent the data or state managed by applets 701. The "keys" of the association's state bindings 401 correspond to the keys to the key-value pairs 701 managed by an applet 201. In addition, a key is bound to a specific object or variable 704 in the server to which it is synchronized. En a preferred embodiment the value in a key-value pair 701 is preferably an object or an aggregation of objects that is one of four classes: string, array, dictionary, or data (referred to as a property-list type of object). Action bindings 402 consist of a mapping between an event that Applet 201 triggers, for example (applets can support in unlimited number of actions), and an action on the server. An Action can be implemented, for example, as method 703. Using Action bindings 402, when an event 702 occurs, method 703 on the server is invoked.

Synchronization may occur at various points in time. In one embodiment, actions provide one of the synchronization points for the state as previously discussed. State synchronization can be used to synchronize multiple keys. For example, a TextFieldApplet may have two (2) keys called "StringValue" (text) and "echoCharacter" (single character string to be used as the echo character used, for example. In a password field). The value for the "StringValue" key is she text mat the user has entered; and the value for the "echoCharacter" key is the single character that is echoed to the display device (e.g. "*"). Thus, the TextFieldApplet has two key-value pairs (the INPUTFIELD and OUTPUTFIELD elements from Table One are TextFieldApplets with only one key (stringValue) defined in the declarations file of Table 2). State bindings 401 are used to bind the key-value pairs of the TextFieldApplet with server state 704 (e.g., an object or variable resident on the server). Further, an action binding 402 of an instance of Associations 302 associated with the TextFieldApplet may specify a method 703 that occurs upon the happening of an event 702 (e.g., entry of a carriage return) associated with the text field. In addition, state synchronization can be used to synchronize multiple keys for multiple different applets.

Another example is that of a ButtonApplet. A buttonApplet is another example wherein state synchronization is used to synchronize multiple keys. An instance of ButtonApplet may have two keys entitled "Title" and "Enable". The value of the "Title" key contains the title of the button that is displayed. The value of the "Enable" key determines whether the button is enabled or disabled (whether it may be depressed or not). For example, the BUTTON applet defined in Table Two contains one key "title". The action for a ButtonApplet is, for example, the event that occurs when the button is pressed. The action associated with the BUTTON applet at Table Two, for example, is capitalizeString defined in the script file of Table Three.

Referring to FIG. 3, the AFT (Application Programming Interface) (e.g., interfaces 204-206) that the Associations 302 uses to communicate with applets 201 makes a determination as to what the applet's value for an Association's key is and what the new value for that key is (whether the value has changed). Consequently, the interface merely needs to have access to the keys and values of the applets. As a result, any existing applet may be used in the present invention as long as the applet is supposed by an API that permits the retrieval and setting of its keys and values. An Association that utilizes the API is used to communicate with the applet.

Figure 5:
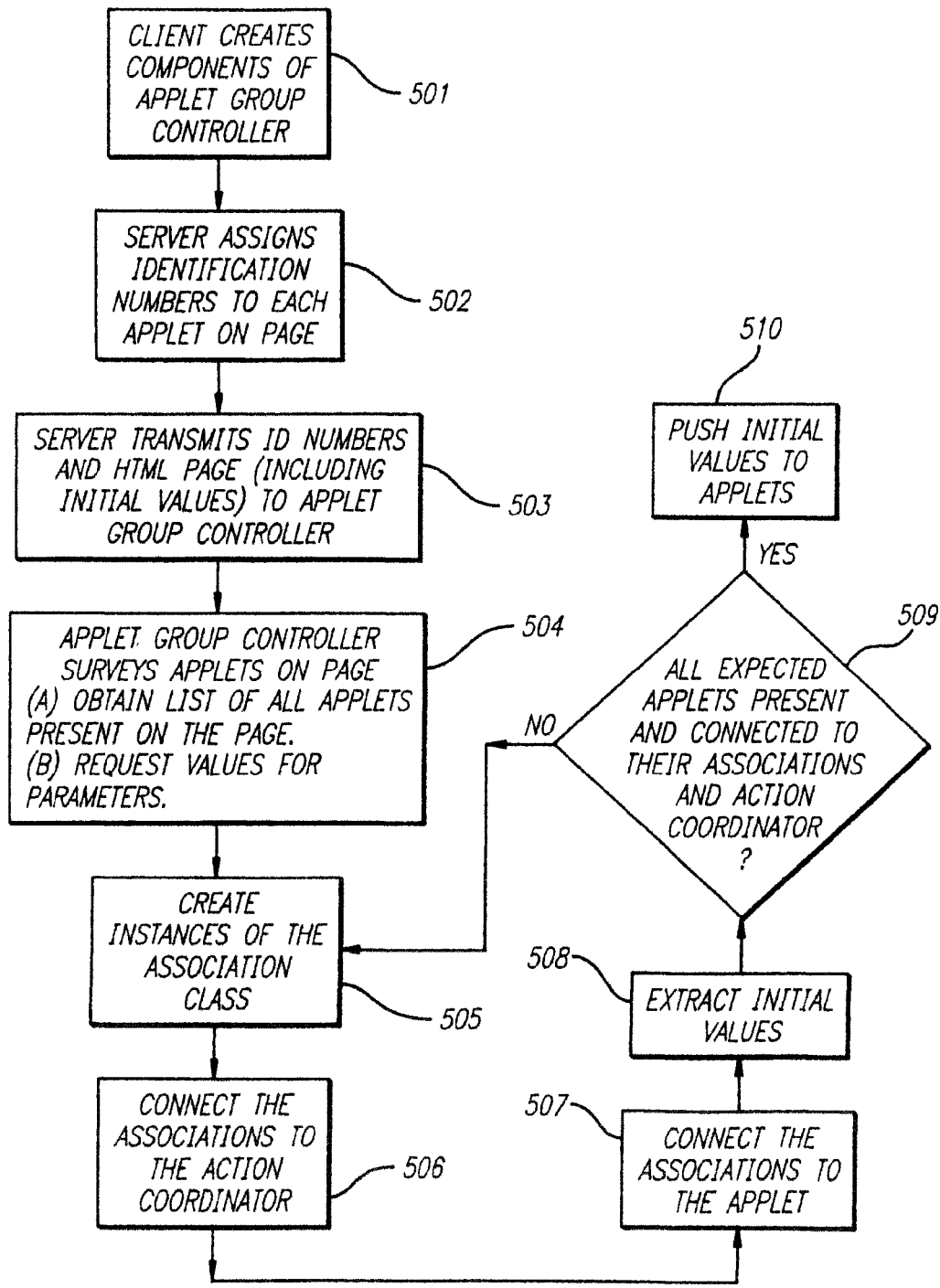
FIG. 5 demonstrates an initialization process for the Applet Group Controller according to an embodiment of the invention.

At runtime, an initialization procedure is preferably executed for Controller 202. During the initialization of Controller 202, the various associations are instantiated and connected to the applets, and initial values are parsed and distributed to the applets. The details of the Controller Initialization process are set forth in FIG. 5.

Step 501 of the initialization procedure creates components 501 of the Controller 202 including, for example, Action Coordinator 301 (discussed below) and Communications Channel 303 (discussed below). In a preferred embodiment, the server assigns identification numbers (the identification numbers are later used to ensure all applets are accounted for) to each applet on the HTML page at step 502. At step 503, the server transmits the identification numbers, the HTML page (including initial parameter values for the applets) to the applet group controller 202. At step 504, the applets on the browser page are surveyed. Step 504 includes the creation of a list of all of the page's applets currently present on the client. In addition, the various initial parameters (set in the HTML page) are retrieved. One such initial parameter that the web page creator passes into each applet is the class of the Association. If an Association class is retrieved as a parameter, a connection to the Association is established using the class information supplied by the parameter. As a result, the Association class parameter is looked-up by name (utilizing common Java procedures, for example), and an instance of that class is created at step 505 (thereby creating an Association for that applet). To create an instance of the class, for example, the Java code might read:

newAssoc=(Association)assocClass.newInstance( );

At step 506, an instance of Association 302 is connected to Action Coordinator 301. This connection is used by Association 302 to instruct Action Coordinator 301 to invoke an action, and by Action Coordinator 301 to set values into Association 302. Association 302 is then connected to an applet 201 at step 507. This connection consists of Association 302 obtaining a reference to Applet 201. At step 508, all of the initial values (e.g., passed in through parameter tags in the HTML document) are extracted. The initial values are then placed into a dictionary of values located on the client's computer. The dictionary (or snapshot of the keys and their current values) is used upon invocation or an action.

Controller 202 repeats the connection process (steps 505-508) until all of the applets 201 expected (an applet is expected if an identification number was transmitted from the server) have been processed. Thus, at step 509, a determination is made whether all of the expected applets 201 are present and connected to their associations 302 and to Action Coordinator 301. Each of Associations 302 maintain connection with Action Coordinator 301 and with its corresponding instance of applet 201.

If it is determined at step 509 that all of the expected applets 201 are present (i.e., an applet is found for every identification number transmitted by the server) and initialized, the initial values are pushed from the dictionary to the Associations 302 and to the appropriate Applets 201.

FIG. 3 illustrates an initialized Applet Group Controller 202. As a result of the above initialization process. Communications Channel 303, Action Coordinator 301, and instances of Associations 302 were created; the Associations 302 are connected to Action Coordinator 301 and corresponding Applets 201; and a dictionary of the keys and their values was created. All of the values in the dictionaries (as transmitted from the server) are transmitted to Applets 201 thereby providing initial synchronization between the client and the server.

Figure 6A:
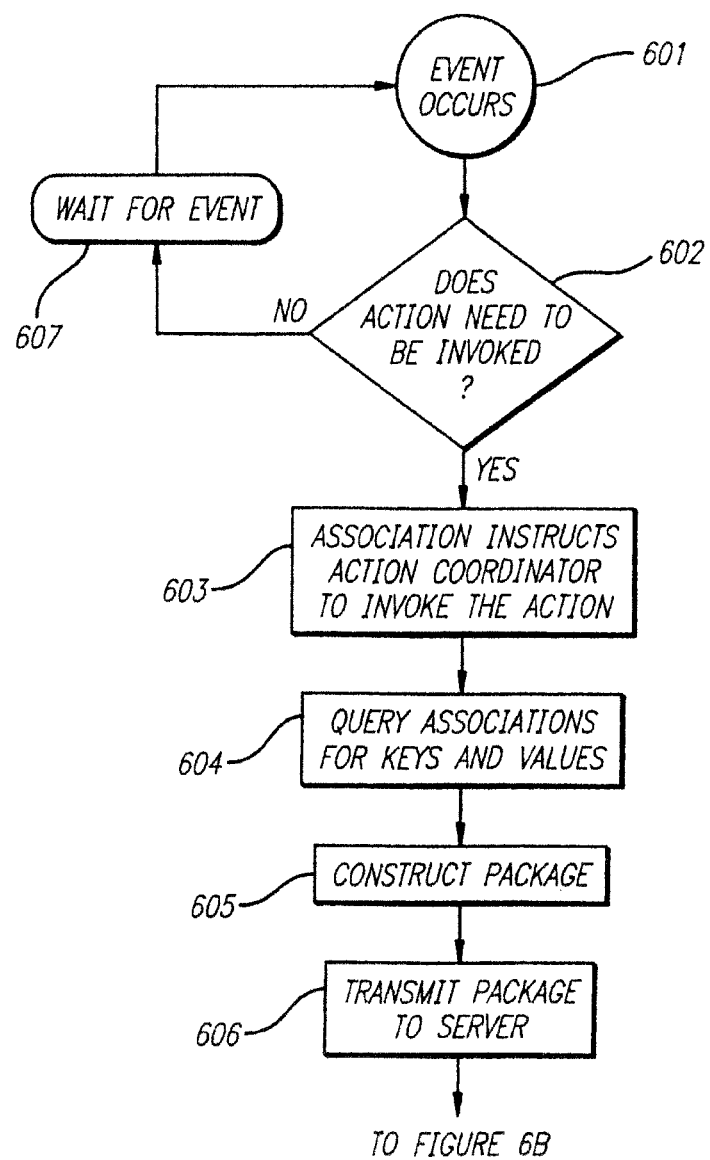
FIG. 6A demonstrates a client-side synchronization process according to an embodiment of the invention.

Referring to FIGS. 3 and 6A, in a preferred embodiment, upon the occurrence of an event (e.g., the clicking of a button icon), an instance of Associations 302 recognizes that the event has occurred at step 601 of FIG. 6A, and determines whether the event requires the invocation of an action at step 602 (e.g. the instance of Associations 302 determines whether an action associated, with the clicked button should be invoked). If no action is required, processing continues at step 601. If Associations 302 determine that an action should be invoked, it instructs Action Coordinator 301 at step 603 to invoice the action.

Upon receiving invocation instructions from, the instance of Association 302, Action Coordinator 301 queries Associations 302 for the values for all of their keys at step 604. The values retrieved are examined to determine whether the value has been changed since the last communication with the server (e.g., the values retrieved are compared to the values in the dictionary). If any values have changed, synchronization with the server takes place. Action Coordinator 301 constructs a package of data to be sent to the server at step 605. In the preferred embodiment of the present invention, the package includes a list of only those properties that have changed in the browser since the last communication with the server and the action that is to be invoked on the server.

Action Coordinator 301 transfers the package to Communications Channel 303. Communications Channel 303 provides a standard interface to Controller 202 and implements an arbitrary channel of communication 203 back to the server. Communications Channel 303 transmits the package to the server at step 606 via channel of communication 203. Communications Channel 203 may be implemented in a variety of different communication protocols. However, in the preferred embodiment of the present invention, Communications Channel 203 is implemented in HTTP to communicate with the server in the same manner as a browser. Further, by using HTTP, the present invention uses a communication channel that is already being passed through a firewall (a firewall is machine that fits between a local network (e.g., a company's internal network) and the internet and limits the access that can pass between the internal local network and the internet as a whole) in order to allow access to the web site. Consequently, by using HTTP, there is no need to create a new hole in the firewall.

Figure 6B:
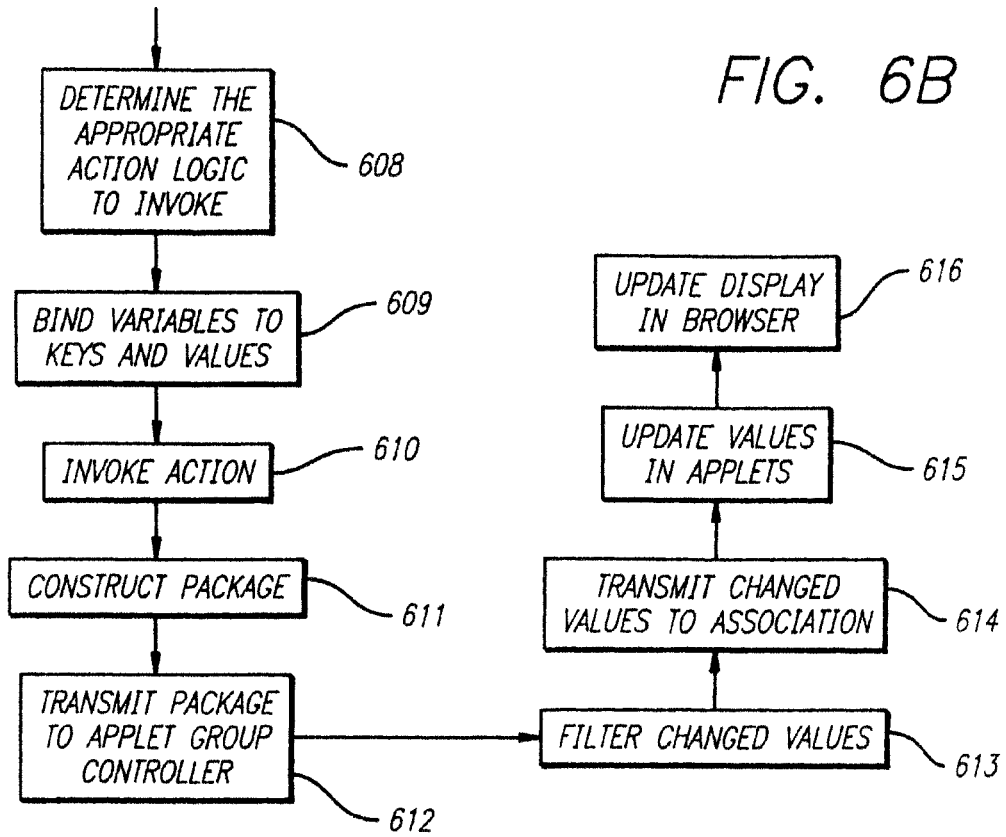
FIG. 6B demonstrates a server-side synchronization process according to an embodiment of the invention.

Referring to FIG. 6B, upon receipt of the package from the browser, the server determines the appropriate action logic (e.g., method, function, or script) at step 608. The server then binds the logic's variables to the keys received at step 609. For example, die server binds the variables contained in a script using the keys transmitted from the client. Using the bindings, the variables are updated with the new state to which they are bound. As a result, prior to the invocation of the action, the new values are established in the variables that are used by the action.

The server invokes the actions at step 610. Subsequent to the invocation of the action, the server constructs a package 611 at step 611 to be sent back to the browser. In constructing the package, the server determines whether a new HTML document/page is to be rendered. If a new page is to be rendered, an HTML document is created and the URL for that document is transmitted back to the Applet Group Controller 202 in the browser. The browser then retrieves the HTML document from the URL. However, if the state merely needs to be synchronized on the browser, there is no need to generate a new page. Instead, the bindings are evaluated and the states are packaged together (e.g., the values for the variables contained in the action logic are retrieved and used to create key-value pairs). In the preferred embodiment, only those values that have changed since the last communication with the browser are compiled into the package. The package is then transmitted at step 612 through channel of communication 203 to Communications Channel 303 in Controller 202. Further, in a preferred embodiment, the value that have changed are transmitted and synchronization occurs regardless of whether a new HTML page is to be rendered.

The package is transferred from Communications Channel 303 to Action Coordinator 301. In one embodiment, the values that have changed are identified at step 613 fin such an embodiment, the package contains all of the values regardless of whether they have changed). The appropriate values are then transmitted to the appropriate instances of Association 302 at step 614. The instances of Associations 302 distribute the values back to Applets 201 at step 615. Instead of rendering a whole new page (as in the prior art), the applet updates the Web page using the updates received from Associations 302 on the display device if required at step 616.

As previously discussed, in the preferred embodiment of the present invention, Action Coordinator 301 maintains a dictionary of the keys and their values at the time of the last communication with the server (referred to as a snapshot of the keys and they values). When Action Coordinator 201 queries Associations 302 to determine the keys and their values, a comparison is performed between Hie values contained in the dictionary and the values stored in Associations 302. Only those values that have changed since the last communication with the serve; are compiled into the package that is transmitted to the server. In addition, in the preferred embodiment of the present invention, the server also maintain a dictionary containing the keys and their bindings to application logic variables (bindings) at the time of the last communication with Controller 202 (a snapshot). Prior to transmitting the package back to Controller 202, all of the bindings are evaluated and only those values that have changed during the course or execution of the action are packaged and transmitted back to the controller 202. In this manner, only those bindings that require synchronisation are transmitted to the server and vice versa.

According to one embodiment of the invention, an Applet Group Controller is initialized which includes creating various components (e.g., an action coordinator, communications channel, and associations). Connections are formed between the components of Applet Group Controller 202. A snapshot is created of the current state preferably using a dictionary of keys and their values. Upon occurrence of an event, an association instructs the action coordinator to invoke an action and the keys and values are surveyed. A package of keys and their values is constructed and transmitted to the server where the values are bound to variables and action logic is invoked. Upon any change in the values (as a result of the execution of the action logic), a package of changed values and their keys is constructed and transmitted back to the Applet Group Controller. The changed values are pushed to the appropriate applets (through their Associations) and the values are displayed by the browser. In this manner, the information is updated and synchronized between the client and the server.

Thus, a method and apparatus for synchronizing information between a client and a server is provided.

The invention claimed is:

1. A method of synchronizing information comprising:
accepting user input via a display page at a first computer;
using a record of values received from the second computer to determine first computer values associated with said user input that have changed since a last communication with the second computer;
constructing a first package that includes said first computer values;
transmitting said first package to a second computer;
receiving from said second computer a synchronization information, wherein said second computer is configured to compare said first computer values from said first package with one or more second computer variables; construct said synchronization information based at least in part on information resulting from said comparison; and transmit said synchronization information to said first computer; and
updating the display page at said first computer based at least in part on said synchronization information by using the synchronization information to update a portion of the display page as displayed at the first computer without requiring retransmission of the entire display page.

2. A method as recited in claim 1, further comprising initializing communication between said first computer and said second computer.

3. A method as recited in claim 2, wherein initializing communication between said first computer and said second computer includes using a browser or other client software at the first computer to retrieve the display page from the second computer.

4. A method as recited in claim 1, wherein the display page comprises a web page.

5. A method as recited in claim 4, wherein updating the display page at said first computer comprises updating a web page as displayed at the first computer without requiring an entire web page to be rendered.

6. A method as recited in claim 1, wherein accepting user input at said first computer comprises accepting user input in an input field of the display page.

7. A method as recited in claim 1, wherein said first package includes one or more key-value pairs.

8. A method as recited in claim 1, wherein said first package further includes an action data indicating an action to be invoked at the second computer.

9. A method as recited in claim 8, wherein the second computer is configured to use said action data to determine an action logic to be invoked at the second computer.

10. A method as recited in claim 1, wherein transmitting said first package comprises sending an HTTP communication.

11. A method as recited in claim 1, wherein transmitting said first package comprises sending an HTTP communication; and wherein said first package comprises one or more key-values and an action data indicating an action to be invoked at the second computer.

12. A method as recited in claim 1, wherein said display page comprises a web page; said user input comprises an input received via the web page as displayed at the first computer; and said synchronization information is used at the first computer to update a portion of the web page as displayed at the first computer without requiring retransmission of the entire web page from the second computer to the first computer.

13. A system comprising:
a communication interface; and
a processor coupled to the communication interface and configured to:
accept user input via a display page at a first computer;
use a record of values received from the second computer to determine first computer values associated with said user input that have changed since a last communication with the second computer;

construct a first package that includes said first computer values;

transmit said first package, via said communication interface, to a second computer;

receive from said second computer, via said communication interface, a synchronization information, wherein said second computer is configured to compare said first computer values from said first package with one or more second computer variables; construct said synchronization information based at least in part on information resulting from said comparison; and transmit said synchronization information to said first computer; and update said display page at the first computer based at least in part on said synchronization information by using the synchronization information to update a portion of the display page as displayed at the first computer without requiring retransmission of the entire display page.

14. A system as recited in claim 13, wherein the display page comprises a web page.

15. A system as recited in claim 13, wherein accepting user input at said first computer comprises accepting user input in an input field of the display page.

16. A system as recited in claim 13, wherein said first package includes one or more key-value pairs.

17. A system as recited in claim 13, wherein said first package includes an action data indicating an action to be invoked at the second computer.

18. A system as recited in claim 17, wherein the second computer is configured to use said action data to determine an action logic to be invoked at the second computer.

19. A system as recited in claim 13, wherein transmitting said first package comprises sending an HTTP communication.

20. A system as recited in claim 13, wherein the processor is further configured to retrieve the display page from the second computer.

21. A system as recited in claim 13, wherein transmitting said first package comprises sending an HTTP communication; and wherein said first package comprises one or more key-values and an action data indicating an action to be invoked at the second computer.

22. A system as recited in claim 13, wherein said display page comprises a web page; said user input comprises an input received via the web page as displayed at the first computer; and said synchronization information is used at the first computer to update a portion of the web page as displayed at the first computer without requiring retransmission of the entire web page from the second computer to the first computer.

23. A non-transitory computer readable storage medium comprising computer instructions which when executed by a computer cause the computer to perform the steps of:

accepting user input via a display page at a first computer;

using a record of values received from the second computer to determine first computer values associated with said user input that have changed since a last communication with the second computer;

constructing a first package that includes said first computer values;

transmitting said first package to a second computer;

receiving from said second computer a synchronization information, wherein said second computer is configured to compare said first computer values from said first package with one or more second computer variables; construct said synchronization information based at least in part on information resulting from said comparison; and transmit said synchronization information to said first computer; and updating the display page at said first computer based at least in part on said synchronization information by using the synchronization information to update a portion of the display page as displayed at the first computer without requiring retransmission of the entire display page.

24. A non-transitory computer readable storage medium as recited in claim 23, wherein the display page is a web page.

25. A non-transitory computer readable storage medium as recited in claim 23, wherein accepting user input at said first computer comprises accepting user input in an input field of the display page.

26. A non-transitory computer readable storage medium as recited in claim 23, wherein said first package includes one or more key-value pairs.

27. A non-transitory computer readable storage medium as recited in claim 23, wherein transmitting said first package comprises sending an HTTP communication.

28. A non-transitory computer readable storage medium as recited in claim 23, wherein said display page comprises a web page; said user input comprises an input received via the web page as displayed at the first computer; and said synchronization information is used at the first computer to update a portion of the web page as displayed at the first computer without requiring retransmission of the entire web page from the second computer to the first computer.

* * * * *